(12) United States Patent
Wenzel et al.

(10) Patent No.: US 8,313,134 B2
(45) Date of Patent: Nov. 20, 2012

(54) INTEGRATED STRUCTURAL MEMBER FOR A VEHICLE AND METHOD OF MAKING

(75) Inventors: Edward J. Wenzel, Troy, MI (US); Robert Van Jaarsveld, Macomb, MI (US); Ronald Widin, Beavercreek, OH (US); Joseph A. Bertucci, Farmington Hills, MI (US); Gregory J. Kowalski, Sanborn, NY (US)

(73) Assignee: Inteva Products, LLC, Troy, MI (US)

( * ) Notice: Subject to any disclaimer, the term of this patent is extended or adjusted under 35 U.S.C. 154(b) by 185 days.

(21) Appl. No.: 12/794,831

(22) Filed: Jun. 7, 2010

(65) Prior Publication Data

US 2010/0244490 A1 Sep. 30, 2010

Related U.S. Application Data

(60) Division of application No. 11/689,205, filed on Mar. 21, 2007, now Pat. No. 7,731,261, which is a continuation-in-part of application No. 11/555,119, filed on Oct. 31, 2006, now Pat. No. 7,784,187, which is a division of application No. 10/846,003, filed on May 14, 2004, now Pat. No. 7,128,360, which is a continuation-in-part of application No. 10/316,683, filed on Dec. 10, 2002, now abandoned.

(60) Provisional application No. 60/784,273, filed on Mar. 21, 2006.

(51) Int. Cl.
*B62D 25/14* (2006.01)

(52) U.S. Cl. .............................. 296/70; 180/90; 454/127

(58) Field of Classification Search ............. 296/187.03, 296/190.09, 280, 70, 20, 708; 180/90; 280/751, 280/752; 454/127
See application file for complete search history.

(56) References Cited

U.S. PATENT DOCUMENTS

| | | | |
|---|---|---|---|
| 5,580,122 A | 12/1996 | Muehlhausen | |
| 6,648,402 B2 * | 11/2003 | Scheib et al. | ............ 296/203.02 |
| 6,705,672 B2 | 3/2004 | Shikata et al. | |
| 2003/0122404 A1 | 7/2003 | Duchez | |
| 2003/0152745 A1 | 8/2003 | Wagenblast | |
| 2003/0227195 A1 | 12/2003 | Charbonnel | |

(Continued)

FOREIGN PATENT DOCUMENTS

DE 4409081 C1 4/1995

(Continued)

OTHER PUBLICATIONS

Print out from http://news.thomasnet.com/fullstory/48 0649/4825 dated Mar. 20, 2006, 3 pages.

(Continued)

*Primary Examiner* — Lori Lyjak
(74) *Attorney, Agent, or Firm* — Cantor Colburn LLP (57) ABSTRACT

An integrated structural system for a vehicle is provided, the integrated structural system having: a structural member; a first beam component secured to the structural member by a molding process, the first beam component being molded from a first amount of thermoplastic material, wherein the configuration of the first beam component is defined by the molding process; and a second beam component secured directly and only to the first beam component by a vibration weld, the second beam component being separately molded from a second amount of thermoplastic material, the second beam component having a configuration different from the first beam component.

15 Claims, 10 Drawing Sheets

U.S. PATENT DOCUMENTS

2004/0135400 A1  7/2004  Matsuzaki et al.

FOREIGN PATENT DOCUMENTS

| | | |
|---|---|---|
| DE | 10022360 A1 | 11/2001 |
| DE | 102004032951 A1 | 1/2006 |
| EP | 0492129 A1 | 7/1992 |
| EP | 1323624 A1 | 7/2003 |
| EP | 1350711 A1 | 10/2003 |
| EP | 1415897 A2 | 5/2004 |
| JP | 05084776 | 4/1993 |
| JP | 2001237022 | 8/2001 |
| JP | 2003260724 | 9/2003 |
| WO | 2005097456 A1 | 10/2005 |
| WO | 2006002900 A1 | 1/2006 |

OTHER PUBLICATIONS

Written Opinion for PCT/US07/007034 dated Mar. 21, 2007.
International Search Report for PCT/US07/007034 dated Mar. 21, 2007.
ATZ Automobiltechnische Zeitschrift, Therm-Struktur-Modul Fuer Cockpits, Vieweg Publishing, Weisbaden, DE, vol. 105, No. 11, Nov. 2003, pp. 1089-1094.
PCT Search Report dated Jan. 24, 2008.

* cited by examiner

INTEGRATED STRUCTURAL MEMBER FOR A VEHICLE AND METHOD OF MAKING

CROSS REFERENCE TO RELATED APPLICATION

The present application is a divisional application of U.S. patent application Ser. No. 11/689,205 filed Mar. 21, 2007, which claims the benefit to U.S. Provisional Application Ser. No. 60/784,273 filed Mar. 21, 2006. U.S. patent application Ser. No. 11/689,205 is also a continuation-in-part of U.S. patent application Ser. No. 11/555,119 filed Oct. 31, 2006, which is a divisional of U.S. patent application Ser. No. 10/846,003 filed May 14, 2004 now U.S. Pat. No. 7,128,360, which is a continuation-in-part of U.S. patent application Ser. No. 10/316,683 filed Dec. 10, 2002, now abandoned, the contents each of which are incorporated herein by reference thereto.

BACKGROUND

Typically, instrument panel (IP) cockpit systems consists of a cross-vehicle structural member or beam, generally constructed out of a steel or cast magnesium tube, which carries the load from a steering column extending between a steering mechanism, for example, a steering wheel, and a torque distribution mechanism. The steering column is designed to translate rotation of the steering wheel by a vehicle operator to the torque distribution mechanism, which correspondingly positions the wheels of the vehicle in accordance with the position of the steering wheel, thus steering the vehicle. An issue in most steel beam systems is their high overall mass along with other issues discussed below namely, bracket inaccuracy after welding to the steel beam, beam distortion after welding of brackets to the beam, fit of HVAC module around beam and/or vice versa, minimizing clearances between HVAC ductwork and beam. Other problems include inconsistencies or inefficiencies of the packaging of the beam, HVAC and associated ductwork to maximize available vehicle interior cabin space as well as numerous fasteners and fastening steps, which increase manufacturing costs. In addition, the large amount of component parts and low integration levels create high material costs.

Issues present in magnesium beam systems, are tooling life, high cost of magnesium material, lack dimensional consistency mold-to-mold, high quantity of assembly operations, and limited integration opportunity.

The cross-vehicle structural member is generally a load-bearing member that is used to support attachments such as the instrument panel trim cover and other trim components, airbag module, center console stack, instrument cluster, heating ventilation and air conditioning (HVAC) module, air ducting components, etc. The components of the HVAC module, for example, are attached about the cross-vehicle structural member, such that some components are located on the upper portion of the structural member and other components are located on the lower portion of the structural member, or located about both portions of the structural member depending on the vehicle. The manner in packaging the HVAC and ductwork around the structural member and to the vehicle can minimize the available vehicle interior cabin space. Furthermore, attaching the HVAC module to the structural member allows for undesirable clearances between the HVAC ductwork and the structural member. In another example, the airbag module is generally attached to the structural member either in the upper portion or lower portion of the structural member or both. The airbag module includes an airbag inflator bracket provided to attach the airbag components to the structural member using, for example, one or more threaded bolts and corresponding nuts which can raise both assembly costs and material costs.

Other components, such as, for example, energy absorbing brackets used to manage knee intrusions to the instrument panel upon collision are also attached to a portion of the structural member via arc welding or the use of one or more mechanical fasteners. Additional vehicle components welded or mechanically attached to the beam include center support brackets, instrument panel support brackets, cluster support brackets, HVAC mount brackets and glove box attachment brackets. Moreover, these brackets are typically secured using welding techniques (e.g., arc welding) that result inaccuracies in bracket location due to material distortion by for example, the high temperatures associated with the arc welding process. As such, issues that are present with these current structural beam assemblies include, but are not limited to, having large number of individual components and low integration potential (e.g. high material costs). In addition, the dimensional compliance of the beam assembly will be less due to the amount of components being secured thereto and the methods used for securement (e.g., arc welding).

Accordingly, it is desirable to have an integrated structural system that integrally molds an upper beam component that defines a housing for receiving an airbag module to a structural member for reducing system cost by eliminating a separate inflator/airbag housing as well as improve upon the registration of the airbag assembly to the instrument panel. It is also desirable to have an integrated structural system that integrally welds a lower beam component that defines an HVAC module and other components (e.g. air ducting module) to the upper beam component or structural member for providing the use of common surfaces between components, eliminating separate components, eliminating clearances between components, and minimizing system noise, vibrations, and harshness (NVH) issues as well as mass.

Additionally desirable is an integrated structural system that includes a structural member that can be manufactured from a single material but can also be comprised of multiple sections of different material types and/or wall thicknesses welded together using an improved welding technique to form a structural member possessing a high level of stiffness and energy management properties as well as meet vehicle requirements while minimizing cost and mass of the construction. Likewise, the use of technology such as deformation resistance welding to join the steel tubes facilitates the production of a strong, dimensionally accurate weld using similar or dissimilar materials is also desirable. It is also desirable to use such technology to weld end brackets on each end of the structural member for securing the structural member to the shear walls of the vehicle.

Furthermore, it is desirable to have an integrated structural system that uses an improved molding technique that eliminates the potential for metal tube crush during molding, facilitates improved surface finish, enables use of plastic composite materials on complex part designs without compromising dimensional accuracy, provides for little or no increase in molding process cycle time, enables for the production of a lightweight over molded metal reinforced structure, and provides for the ability to further minimize and vary the part wall thickness. It is also desirable to have an integrated structural system that greatly enhances the ability to tailor the beam material type, wall thickness, and section shape to precisely meet vehicle requirement.

SUMMARY OF THE INVENTION

Thus, in accordance with exemplary embodiments of the present invention an integrated structural system for a vehicle having integrally molded features for supporting vehicle components thereto within the vehicle, for having structural features for allowing effective distribution of loads within the vehicle, for providing reinforcement to the integrally molded features, for minimizing fastening devices to integrate or attach the vehicle components thereto, and for eliminating clearances between integrally molded features is provided and a method of making the same.

In one exemplary embodiment, a method for forming an integrated structural system for a vehicle is provided. The method comprises: securing a first beam component to a structural member by a molding process, the first beam component being molded from a first amount of thermoplastic material, the structural member being formed from a material different than the first amount of thermoplastic material; and securing a second beam component to the first beam component, the second beam component being separately molded from a second amount of thermoplastic material, the second beam component having a configuration different from the first beam component.

In another exemplary embodiment, a method for forming an integrated structural system for a vehicle is provided. The method comprises: forming a structural member by securing a first structural member to a second structural member, the first structural member having higher mechanical properties than the second structural member; inserting the structural member into a mold cavity; securing a first beam component to the structural member by a molding process, the first beam component being molded from a first amount of thermoplastic material inserted into the mold cavity; removing the structural member from the mold cavity; and securing a second beam component to the first beam component, the second beam component being separately molded from a second amount of thermoplastic material, the second beam component having a configuration different from the first beam component.

In another exemplary embodiment, an integrated structural system for a vehicle is provided. The integrated structural system comprises: a structural member; a first beam component secured to the structural member by a molding process, the first beam component being molded from a first amount of thermoplastic material; and a second beam component secured to the first beam component, the second beam component being separately molded from a second amount of thermoplastic material, the second beam component having a configuration different from the first beam component.

DETAILED DESCRIPTION OF EXEMPLARY EMBODIMENTS

Exemplary embodiments of the present invention are directed to an integrated structural system for a vehicle, and more particularly to an integrated structural system having integrally molded features for supporting vehicle components thereto within the vehicle, for having structural features for allowing effective distribution of loads within the vehicle, for providing reinforcement to the integrally molded features, for minimizing fastening devices to integrate or attach the vehicle components thereto, and for eliminating clearances between integrally molded features. Exemplary embodiments of the present invention are also directed to a method of making the same using molding techniques, which further eliminate the potential for metal tube crush during molding, facilitates improved surface finish, provides for dimensional accuracy, enables adequate material packing, provides for little or no increase in molding process cycle time, enables for the production of a lightweight over molded metal reinforced structure, provides for the ability to further minimize part wall thickness, and greatly enhances the ability to tailor the beam material type, wall thickness, and section shape to precisely meet vehicle requirements.

Figure 1:
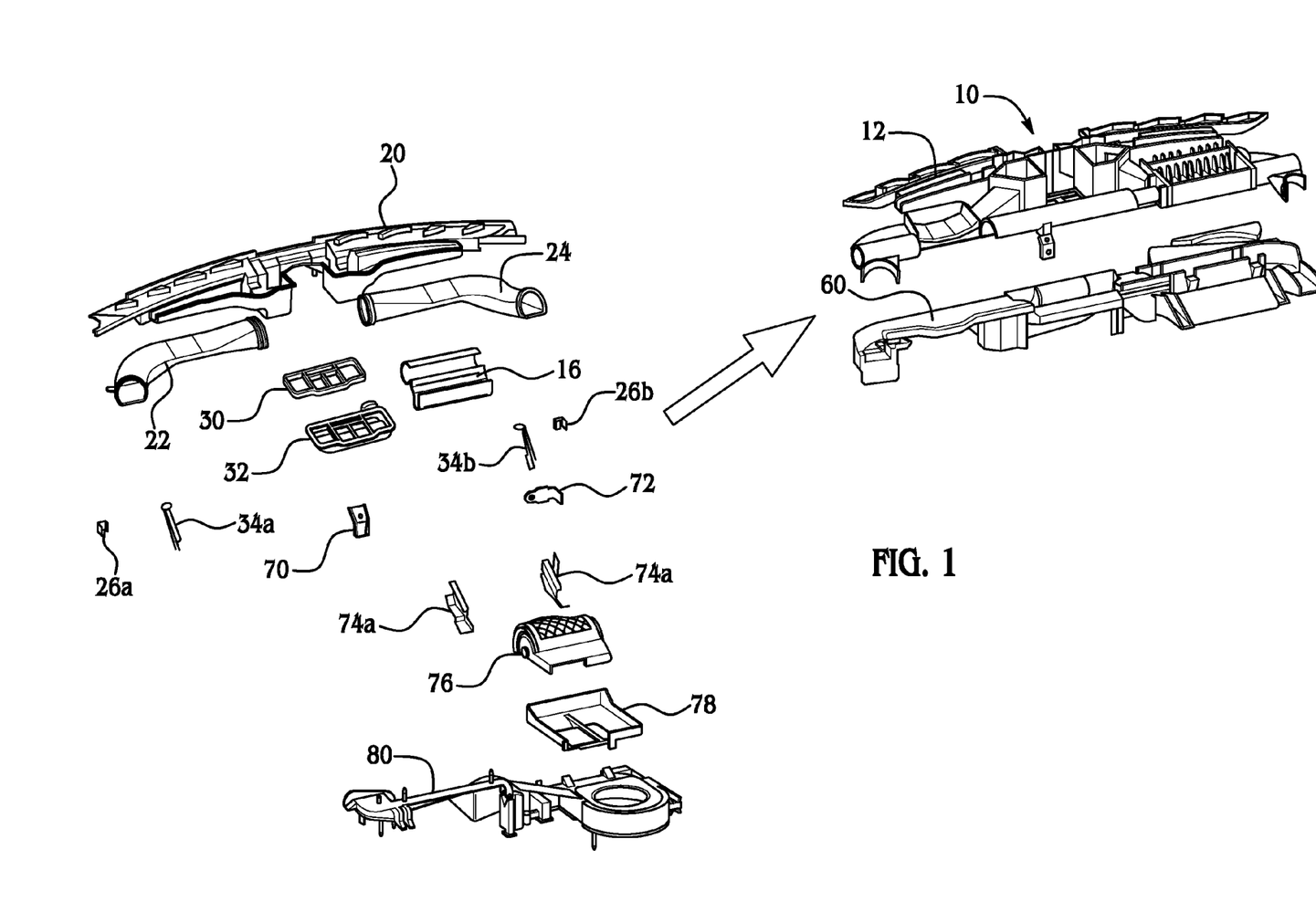
FIG. 1 is an exploded perspective view of a structural beam having multiple components.
Figure 2:
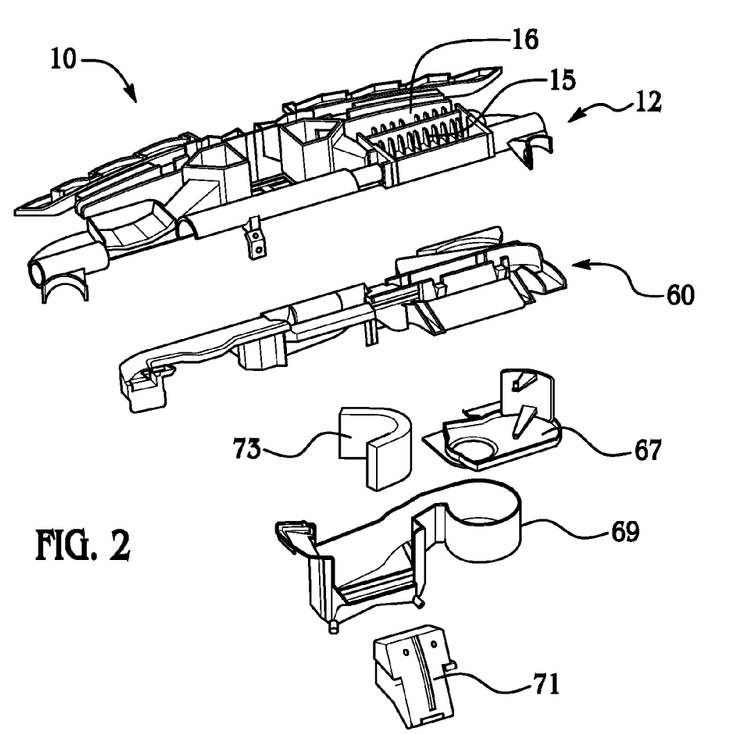
FIG. 2 is an exploded perspective view of an integrated structural system constructed in accordance with an exemplary embodiment of the present invention.
Figure 3:
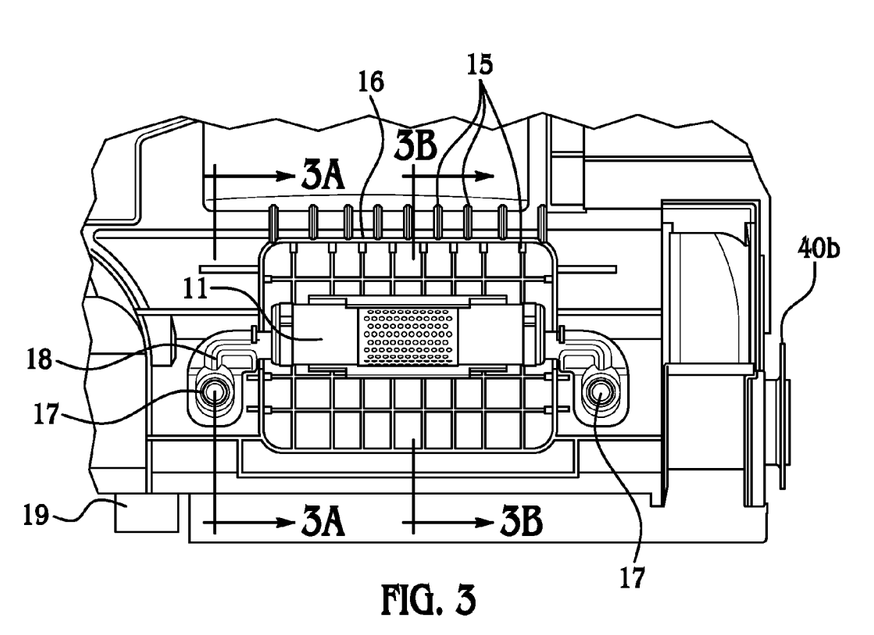
FIG. 3 illustrates portions of an integrated structural system component with an inflator housing, an inflator bracket and an energy absorbing bracket secured to a structural beam member in accordance with an exemplary embodiment of the present invention.

Referring now to FIGS. 1-3, there is illustrated an exemplary embodiment of an integrated structural system 10 in accordance with an exemplary embodiment of the present invention. The integrated structural system 10 includes a first beam component 12, which depending on the application of the integrated structural system and in an exemplary embodiment of the present invention may comprise an upper beam component or a lower beam component. As used herein, lower beam component is intended to refer to a beam component below or secured to a lower surface of the upper beam component. In one non-limiting exemplary embodiment, the first beam component 12 is formed using a reinforced thermoplastic composite material. Alternatively, thermosetting and cyclic thermoplastic resins can be used to form first beam component 12. The first beam component 12 is molded to a structural member 14 using a molding process (e.g. compression molding, injection molding, etc.), which will be discussed in more detail below.

In accordance with an exemplary embodiment the first beam component 12 defines a housing portion or airbag housing 16 to which an airbag inflator bracket 18 is mounted (see FIG. 3). Alternatively, the airbag module housing can be formed from the second beam component that is not molded about the structural member but then later secured to the first beam component molded about the structural member. In accordance with an exemplary embodiment, an inflator 11 and an inflatable cushion are also secured to the housing portion. In accordance with an exemplary embodiment, the housing portion 16 is molded integrally with first beam component and formed using the same reinforced thermoplastic composite material used to form first beam component 12. In one exemplary embodiment, the internal and/or external surfaces of housing portion 16 are gusseted or ribbed to add structural rigidity thereto. Additional reinforcements, such as, for example, a continuous fiber prepreg, stamped metal bracket, a plurality of ribs 15, or a combination thereof can be used to locally reinforce housing portion 16. In accordance with an exemplary embodiment of the present invention, this reinforcement is most easily insert-molded during the compression or injection molding process wherein housing portion 16 is molded with the first beam component. Alternatively, this reinforcement can be inserted or added after part demold or once housing portion 16 is demolded.

In one exemplary embodiment, airbag inflator bracket 18 is mounted within the confines of the airbag housing portion 16 and is fastened directly to a portion of the structural member 14 through the plastic of the airbag housing portion 16. The inflator bracket 18 is fastened to a portion of the structural member 14 via a fastening means. The fastening means can be any type of high-grade fastener, such as, for example, a high-grade bolt 17 as shown. If a fastening bolt is used the bolt will in one exemplary embodiment pass through the entire beam diameter, wherein one end is used to fasten the inflator bracket while the other end can is used to fasten an energy absorbing bracket 19. Alternatively, the bolt can pass through a portion of the structural member or a bracket secured to the structural member. For example, when the bolt is only used to secure the inflator bracket or the energy absorbing bracket to the structural member. In accordance with an exemplary embodiment the energy absorbing bracket is required to manage occupant knee intrusion to the instrument panel upon collision. In accordance with an exemplary embodiment and through the use of the same bolt to secure both the energy absorbing bracket 19 and the inflator bracket 18 exemplary embodiments of the present invention eliminate the need for an additional fastening operation for the energy absorbing bracket or brackets. The integration of the airbag housing into the first or second beam component reduces the manufacturing costs of the integrated structural system by eliminating a separate inflator/airbag housing as well as improvement of the registration of the airbag housing assembly to the instrument panel.

In one exemplary embodiment, bolt 17 passes into a corresponding hole (not shown) on airbag inflator bracket 18, through housing portion 16, through one end of structural member 14 and out another end of structural member 14 as shown, wherein a nut or other securing means is used to secured the bolt, brackets (18 and 19) to the structural member thus, further simplifying the assembly of the integrated system. As shown, the inflator bracket traverses the housing for the inflatable cushion and extends out either side wherein each end of the bracket is secured to the structural member and a corresponding energy absorbing bracket via a mounting bolt, fastener or other equivalent securement means. Of course, it is understood that the configurations of the bracket 18, bolt 17 and bracket 19 may vary from the exemplary embodiment shown in the Figures. In an exemplary embodiment, an energy absorbing bracket 19 required to manage knee intrusion to the instrument panel upon collision is secured to the structural member by the other end of bolt 17 opposite the inflator bracket 18, thereby eliminating the need for an additional fastener for energy absorbing bracket 19. In accordance with an exemplary embodiment energy absorbing bracket 19 is a deformable member configured to resistively deform during a collision and when an occupant contacts the bracket or portions of the instrument panel adjacent to the bracket. In another alternative exemplary embodiment, energy absorbing bracket 19 is welded to the structural member through a welding process, such as, for example, a deformation resistance welding process or protrusion resistance welding process, or a laser welding process or any other equivalent suitable welding process wherein high accuracy of placement is achieved thereby improving the dimensional accuracy of the assembled structural system (e.g., deformation resistance welding, protrusion resistance welding, and laser welding). Moreover and by limiting the amount of components being secured to the structural member and by using these more accurate welding techniques, which are less expensive than prior techniques (e.g., arc welding) the overall cost of the component is reduced. Also, the aforementioned welding processes described above limit the heat input to the weld joint thereby minimizing distortion to the weld, the item being secured and/or the structural member it is being secured to. Likewise, a steering column bracket 27 (FIG. 12*a*) can be secured to structural member 14 using similar processes.

Accordingly, the dimensional accuracies or locations of the components and the first and second beam members provides a structural system suitable for manufacturing in assembly processes as the methods used herein provide repeatable accurate locations and configurations without compromising the overall cost of the system.

Figure 3A:
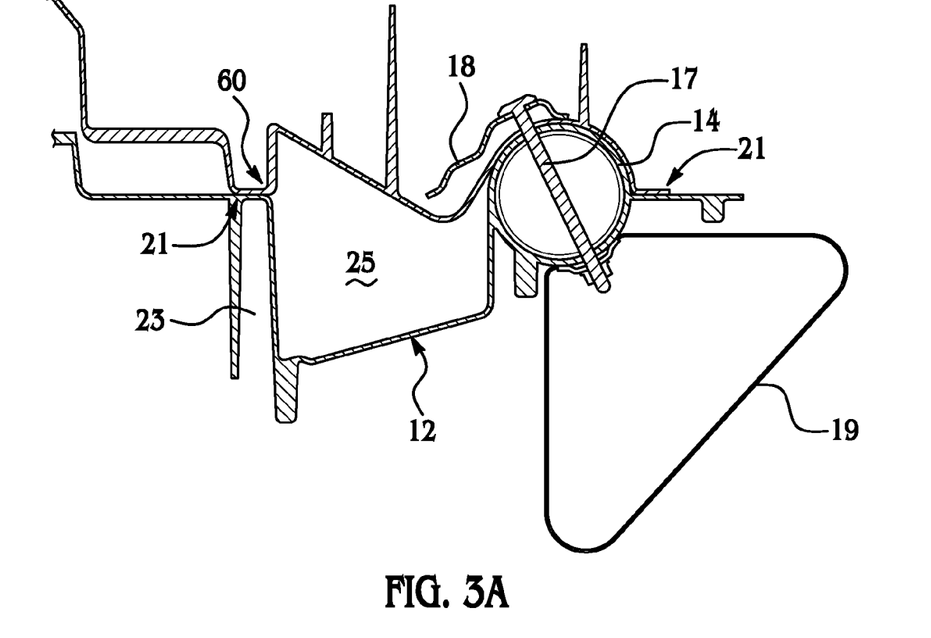
FIG. 3A is a view along lines 3A-3A of FIG. 3.
Figure 3B:
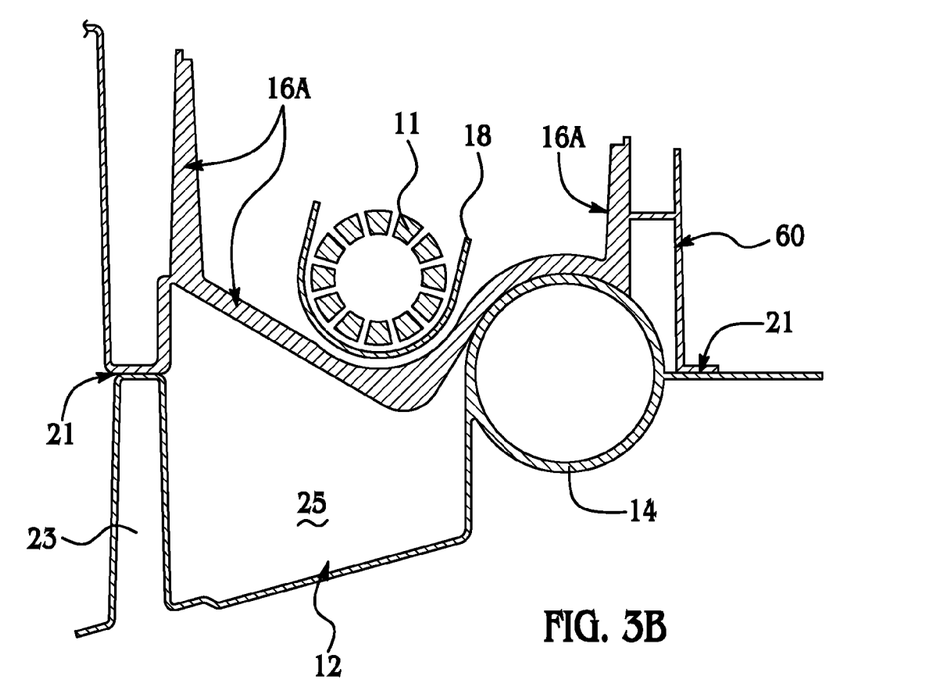
FIG. 3B is a view along lines 3B-3B of FIG. 3.
Figure 3C:
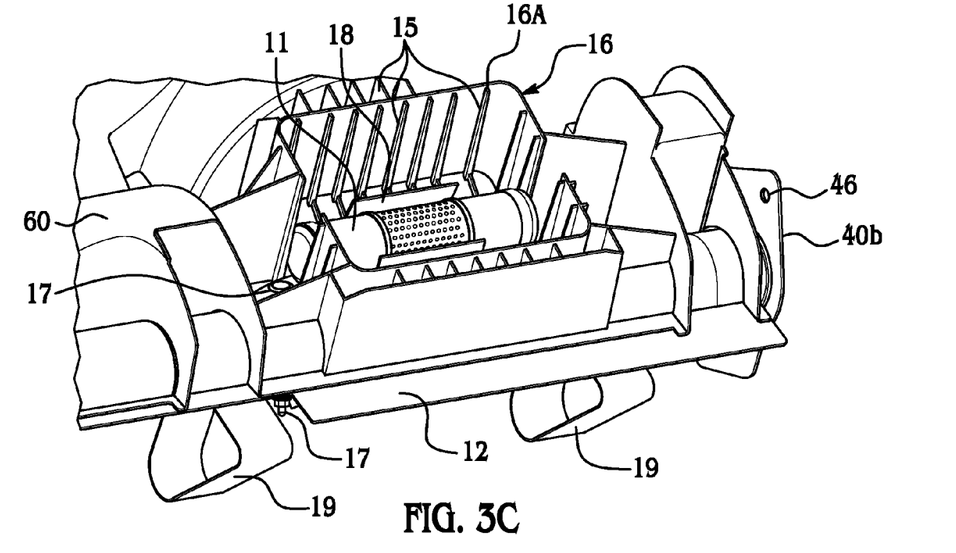
FIG. 3C is a perspective view of an integrated structural system component with an inflator housing, an inflator bracket and an energy absorbing bracket secured to a structural beam member in accordance with an exemplary embodiment of the present invention.

As illustrated in FIGS. 3-3*c*, the first beam component is a lower beam component and the same is molded about structural member 14. Moreover, the airbag module housing is integrally molded with the second beam component 60, which is separately molded and attached to the assembly comprising the first beam component and the structural member. FIGS. 3A and 3B illustrate points of securement 21 wherein portions of the first beam component is secured to the second beam component by any one of the non-limiting methods: adhesive bonding, heat staking, vibration welding, mechanical fastening, laser welding or a combination thereof. Also, shown in FIGS. 3A and 3B are a defrost duct 23 and a vent duct 25. As shown, the defrost duct is formed by the first beam component and the vent duct is formed by the attachment of the first beam component to the second beam component. Of course, and as applications may require, the configurations of the first beam component and the second beam component may vary wherein the locations of the ducts are moved or reconfigured. FIG. 3B also illustrates the walls 16*a* of the airbag module housing.

In accordance with an exemplary embodiment of the present invention and referring now to FIG. 1 the integrated structural system 10 combines numerous separate components into one. As shown, a plurality of separate beam components are shown on the left side of FIG. 1 while the integrated structural system 10 combines these components into a minimal amount of components. For example, the first beam component 12 further defines other vehicle components as shown, the first beam component 12 is molded to include a defrosting duct 20, a first vent duct 22 and a second vent duct 24 for providing air pathways to the driver and passenger side of the vehicle respectively. Duct 20 defines and provides an air pathway to a windshield portion of the vehicle while ducts 22 and 24 define and provide air pathways to side vent and window defrost outlets. Thus, the integral molding of the first beam component 12 negates the need of separately molding ducts 20, 22 and 24 as shown on the left hand side of FIG. 1.

This integral molding of the defrosting duct, the first vent duct, and the second vent duct negates the need for duct mounting brackets 26a and 26b. In addition, the integral molding of first beam component 12 also negates the need for a center manifold gasket 30, a center manifold 32 as the center manifold is now integrally molded with the first beam component 12. The integral molding of the first beam component also negates the need for instrument panel support brackets 34a and 34b that were previously required for windshield defrost duct and instrument panel retainer support.

In one exemplary embodiment, first beam component 12 defining various vehicle components is over-molded to the structural member 14 using low molding pressure. This eliminates the potential for metal tube crush during molding. In other words, the low pressure molding of the first beam component about the structural member prevents deformation of the structural beam component during the mold filling. Moreover, adequate specific molding pressure and control over melt distribution in the mold cavity ensures that the thermoplastic composite is properly "packed out" against a mold cavity and around structural member 14 to control the dimensional characteristics of first beam component 12.

In accordance with an exemplary embodiment, the techniques used to minimize specific molding pressures for compression molding include melt charge placement, temperature, size and shape as well as tooling design and construction. Other non-limiting exemplary methods for compression molding include extrusion compression, extrusion deposit compression and equivalents thereof.

In accordance with another exemplary embodiment, techniques used to elevate the mold surface temperature enhance mold filling. In accordance with an exemplary embodiment and by elevating the temperature of the mold the molding pressures are minimized or reduced while adequate material packing is maintained.

Figure 4:
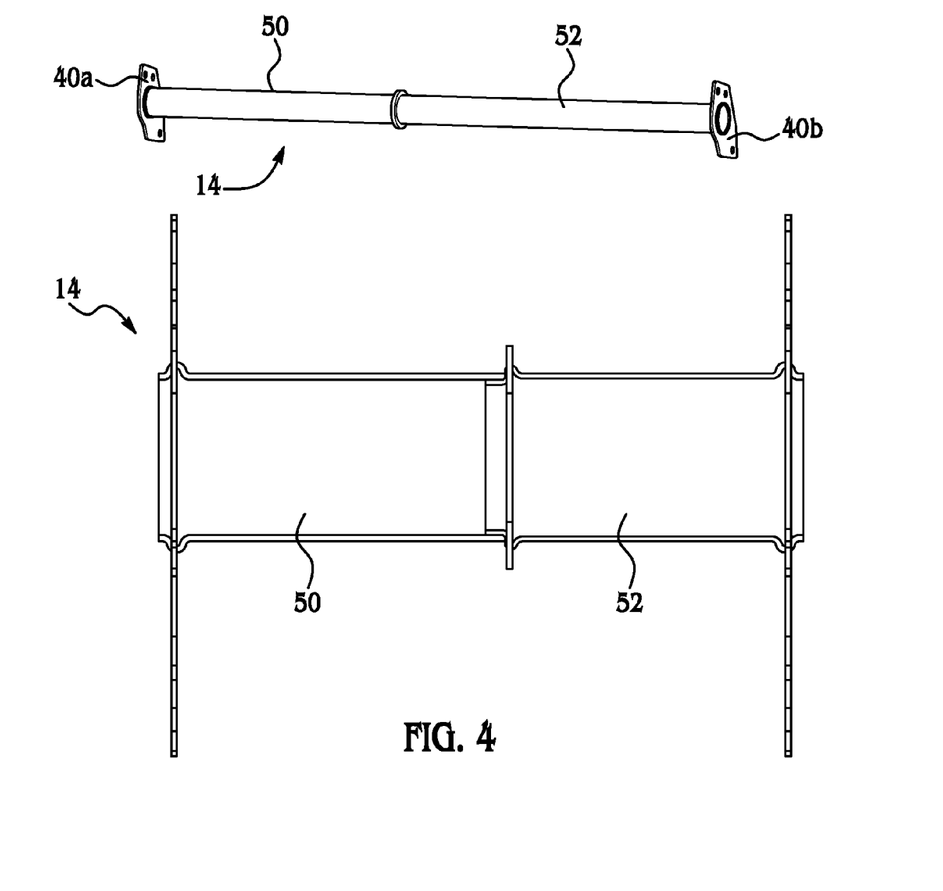
FIG. 4 illustrates a structural member constructed in accordance with an exemplary embodiment of the present invention.

Referring now to FIG. 4, structural member 14, in one non-limiting exemplary embodiment, is manufactured from a single material. In another non-limiting exemplary embodiment, the structural member 14 is formed out of steel. Alternatively, structural member 14 can be comprised of multiple sections of different materials types and/or wall thicknesses and welded together to provide different strengths along its length while minimizing the overall mass of the structural member. It should be understood that structural member 14 can be formed out of any material possessing a high level of stiffness and energy management properties. In accordance with an exemplary embodiment, the structural component is an elongated cylindrical member having securement features attached to either end.

Figure 5:
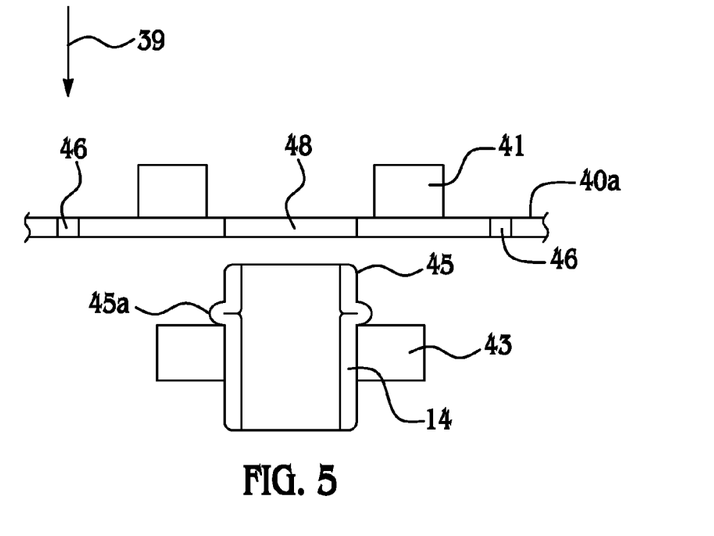
FIG. 5 is a schematic illustration of an end bracket being secured to the structural beam component by a deformation resistance welding process in accordance with an exemplary embodiment of the present invention.

In one exemplary embodiment, the structural member 14 of the integrated structural system 10 includes end brackets 40a and 40b. In accordance with an exemplary embodiment, the end brackets 40a, 40b are secured on each end of structural member 14. The end brackets 40a, 40b enable the metal tube comprising the structural member 14 to be connected to the shear walls of the vehicle. In one exemplary embodiment, end brackets 40a, 40b are secured to each end of the structural member 14 respectively prior to molding first beam component 12 to structural member 14. Preferably, the end brackets 40a, 40b are secured to a respective end of structural member 14 through the use of a Deformation Resistance Welding (DRW) process wherein a first electrode 41 and a second electrode 43 each being in contact with a respect portion of either end bracket and the structural member while a current is passed therethrough and a force is applied during the welding process. A non-limiting example of such a welding process is illustrated in FIG. 5. As shown, an end portion 45 with a protrusion 45a is received within an opening 48 in the end bracket.

Specific details of the steps involved in the DRW process are not described because the details are not necessary for an understanding of the exemplary embodiments of the present invention except to know that electrodes are placed on two opposing surfaces on one end of structural member 14 and on two opposite ends of one end bracket, for example end bracket 40a, and that pressure is applied on structural member 14 and end bracket 40a such that structural member 14 is pressed against end bracket 40a and levels of current are passed through structural member 14 and end bracket 40a, thereby deformation resistance welding together one end of structural member 14 and end bracket 40a as illustrated in FIG. 5. In one exemplary embodiment, a force is applied in the direction of arrow 39 during the deformation resistance welding process. For a more detailed explanation of a suitable deformation resistance welding process that could be used in accordance with an exemplary embodiment of the present invention, see United States Patent Publication Number 2004/0056001, the contents of which are incorporated herein by reference thereto.

Attaching the end brackets 40a, 40b to the metal tube 14 prior to the plastic overmolding process allows the same to be used to ensure accurate and repeatable orientation of structural member in the mold cavity so that the overmolded plastic accurately and repeatedly secured to the structural member.

Figure 6:
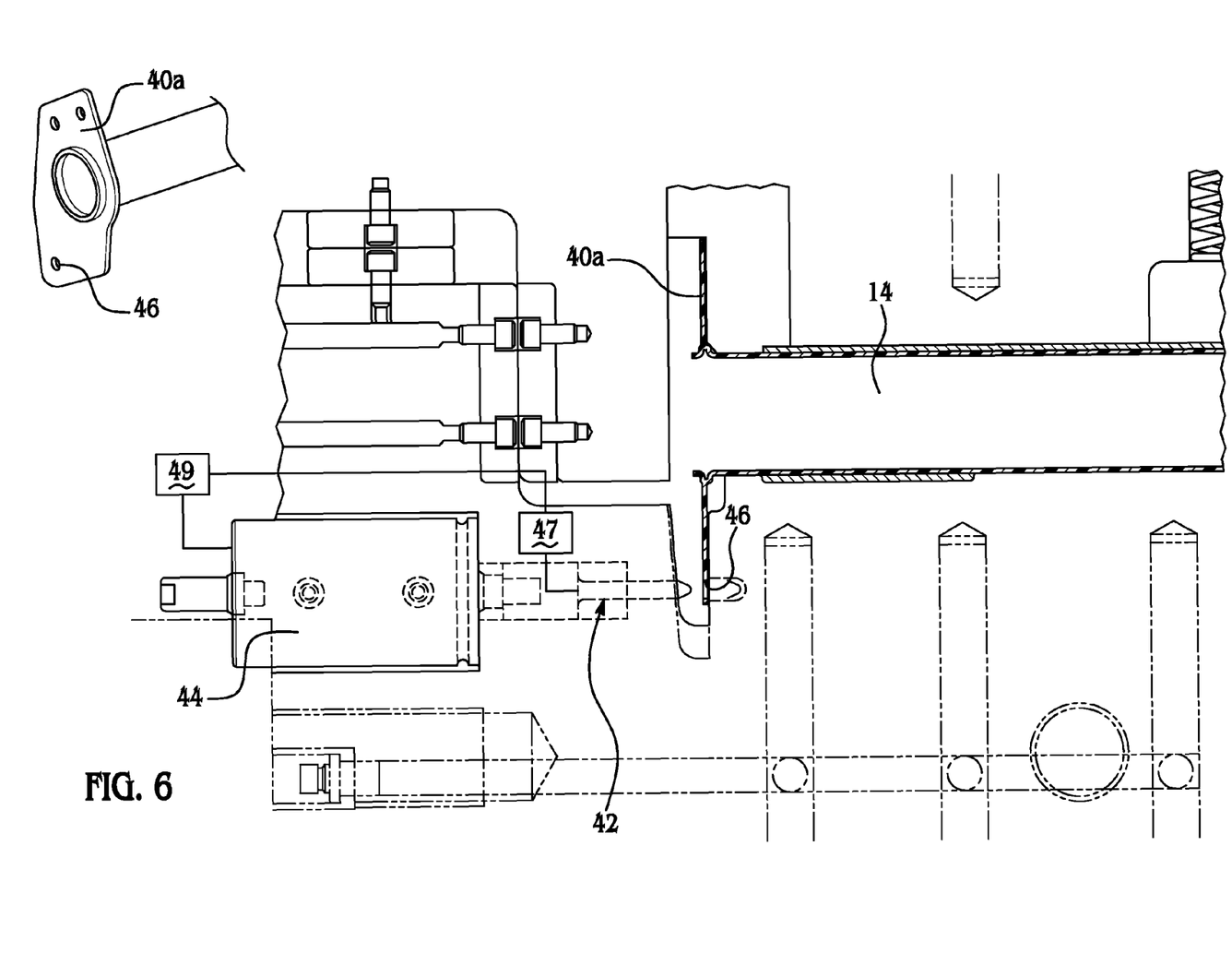
FIG. 6 is a partial cross-sectional view of a mold core and an apparatus for locating the structural beam component in the mold core prior in accordance with an exemplary embodiment of the present invention.

For example, and referring now to FIG. 6, and in one exemplary embodiment, the metal beam or structural component 14 with end brackets (40a and 40b) is loaded into the core half of a mold. Once in position, a locating pin 42 is actuated by a hydraulic cylinder mechanism 44 to engage an opening 46 located in each end bracket as illustrated in FIG. 6. In accordance with an exemplary embodiment the mold cavities are configured to receive the end brackets and the actuating pin moves or ensures that the structural member is properly located within the mold prior to the molding process. As shown, pin 42 is actuated into opening 46 while a portion of the pin may or may not be received within a cavity of the mold die. Alternatively, the appropriate movement of pin 42 will ensure that the structural member is properly located in the mold die. This can be achieved by actuating a pin into one or both of the end brackets. Of course, numerous other mold configurations are contemplated to be within the scope of exemplary embodiments of the present invention. The opening 46 formed on each end bracket is used to secure the structural member 14 to shear walls of the vehicle via a fastening means, such as, for example, a bolt. The locating pin 42 is extended into opening 46 in the respective end bracket. In one exemplary embodiment movement of the locating pin into the opening is measured or detected by a sensor 47 that provides a signal indicative that the locating pin has been received within the opening in the bracket, which can then be used by a controller 49 to begin the molding process. Non-limiting examples of sensor 47 include optical, linear position, hall effect, etc., wherein the movement of the pin 42 into the opening is confirmed and the movement of the pin into the opening appropriately locates the beam 14 in the mold cavity. In other words, if the pin is not able to move into the desired position within the opening in the end bracket, the controller will receive a signal, which will not allow the molding process to begin. In addition, the pin through hydraulic actuator 44 is capable of correctly locating the structural member in the mold cavity. It is, of course, understood that controller 49 and sensor 47 are illustrated schematically in FIG. 6.

In one exemplary embodiment, a signal is given to begin the overmolding process once locating pin 42 is fully extended through opening 46 on each end bracket. It should be understood that more than one opening can be located on each end bracket and configured to receive a respective hydraulically actuated locating pin.

Alternatively, in one exemplary embodiment, locating pin 42 engages an opening (not shown) located on a surface of each end of structural member 14 prior to plastic overmolding. The holes formed on each surface of each bracket of structural member 14 are then used to secure structural member 14 to the shear walls of the vehicles. As shown, the metal beam or structural component 14 with end brackets (40a and 40b) is loaded into a mold or tool 51 having an upper tool portion 53 and a lower tool portion 55.

Referring back to FIG. 4, structural member 14 in one exemplary embodiment includes a first steel tube 50 and a second steel tube 52 each being secured to each other to define the elongated tube of the structural member. In one non-limiting exemplary embodiment, first steel tube 50 has a 2.11 mm thickness (14-gauge) and is utilized on the driver side of the vehicle to provide adequate support for a steering column support (not shown) while second steel tube 52 has a 1.64 mm thickness (16-gauge) and is utilized on the passenger side of the vehicle. Thus, the tubes 50 and 52 are capable of providing varying levels of structural support to the structural member as well as minimizing the overall mass of the structural member. In other words, one tube has different mechanical properties (e.g., strength, hardness, toughness, elasticity, plasticity, brittleness, and ductility and malleability which are used as measurements of how metals behave under a load) than the other tube. Furthermore, by providing a tube construction that is tuned to match the varied cross-car performance requirements of the structural member, the overall weight of the structural member and the integrated structural system is reduced as compared to a unitary beam that traverses the entire width of the vehicle.

In accordance with an exemplary embodiment these properties are described in terms of the types of force or stress that the metal must withstand and how these are resisted common types of stress are compression, tension, shear, torsion, impact, or a combination of these stresses, such as fatigue. Of course, first steel tube 50 and second steel tube 52 can have various thicknesses depending on the application and the thickness or gauges of the tubes can be greater or less than the aforementioned values. However and in one exemplary embodiment, the second steel tube 52, which is located on the passenger side, has a smaller thickness and mass than the first steel tube 50 due to lower load bearing requirements on the passenger side. As such, first steel tube 50 has higher mechanical or structural properties than second steel tube 52 as well as a higher mass although the overall mass of the structural member is reduced accordingly. The structural member 14 can be any shape in cross section as well as axially; however, straightness along the axis of the structural member is optimal from a performance standpoint. For exemplary purposes, structural member 14 is illustrated as a cylindrical tube as shown. In yet another alternative, one tube may be formed from a different material than the other tube for example one tube may be 1010 steel while the other is galvanized steel. Of course, other types of materials are contemplated to be within the scope of exemplary embodiments of the present invention. Non-limiting examples include steel, aluminum, titanium, thermoplastic or thermoset composites or combinations thereof. In yet another alternative, the structural member may be formed from a thermoplastic material, wherein segments 50 and 52 may comprise different types of thermoplastic or steel or any combination thereof. For example, the material used for segment 50 and/or 52 may comprise a carbon reinforced thermoplastic material, a glass fiber reinforced thermoplastic material, combinations thereof or equivalents thereof. In accordance with exemplary embodiments of the present invention, the structural member (e.g., mass and mechanical properties) is tuned to the specific requirements of the vehicle.

In an exemplary embodiment, first steel tube 50 is secured to second steel tube 52 using an annular deformation resistance welding (ADRW) process forming structural member 14, which is a variation of the DRW process used to weld end brackets 40a, 40b to each end of structural member 14. Basically, the first and second tubes are secured to each other by passing a current through a first and a second electrode each of which are secured to either the first steel tube or the second steel tube. Of course, the tubes 50 and 52 may be secured to each other by other suitable processes (e.g., laser welding, arc welding, cold forming and equivalents thereof). Similarly, the end brackets 40a and 40b may also be secured to the structural member by any one of the aforementioned welding processes.

Referring back now to FIGS. 1 and 2, integrated structural system 10 also includes a second beam component 60, which depending on the configuration of the structural system may be a lower beam component or an upper beam component and again depending on the configuration of the system may be molded about the structural member instead of the first beam component. The second beam component similar to the first beam component reduces the number of separate components secured to the integrated structural system. In accordance with an exemplary embodiment, the second or lower beam component 60 is separately formed from the first beam component 12 using a molding process. In accordance with an exemplary embodiment, the second or lower beam component 60 is formed from a thermoplastic composite material, which may or may not be reinforced. In one exemplary embodiment, the second beam component is separately formed from using the same type of thermoplastic material used to form the first beam component 12.

Figure 7:
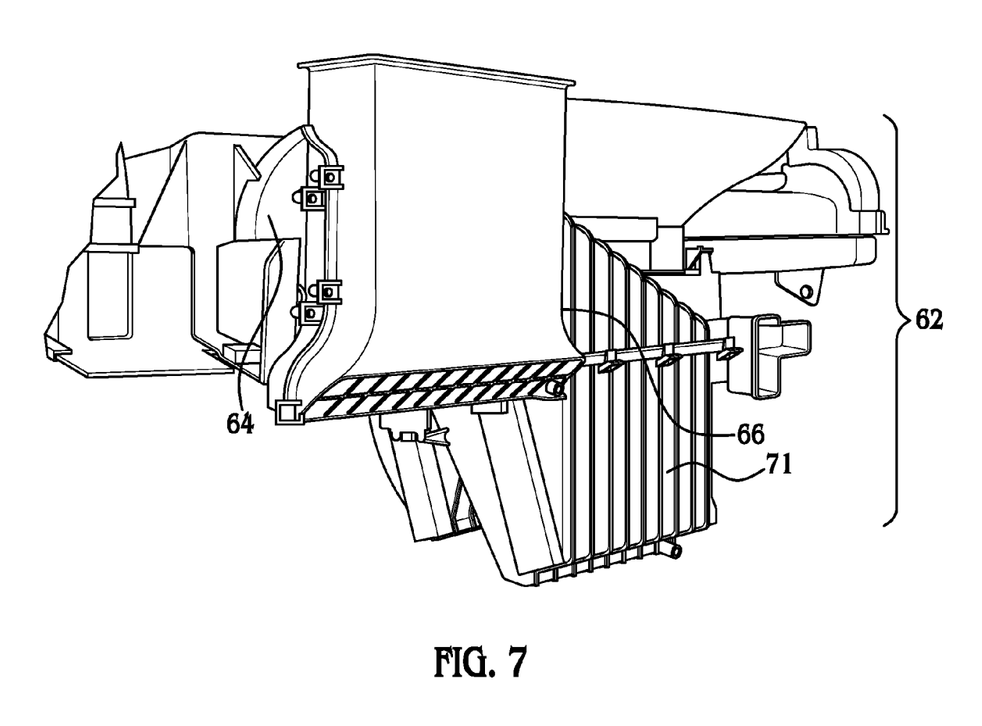
FIG. 7 illustrates a perspective view of the integrated structural system in accordance with an exemplary embodiment of the present invention.

In one exemplary embodiment, second or lower beam component 60 is configured to have other integral components such as a heating, ventilating, air-conditioning (HVAC) module 62 cases that are integrally molded with lower beam component 60. Alternatively, in one exemplary embodiment, significant portions of HVAC module 62 can be integrated into both the first beam component 12 and the lower beam component 60. Such portions include, but should not be limited to, a blower motor scroll 64 and a diffuser 66 as shown in FIG. 7. Other portions include, but should not be limited to, an upper evaporator case 80, air filter housing 78, and air inlet 76 as illustrated in FIG. 1. In one exemplary embodiment, portions of the HVAC module 62 are formed by the same reinforced thermoplastic composite material used to form lower beam component 60. In exemplary embodiment and as illustrated in FIG. 2, other components such as an orifice plate 67, a lower scroll housing 69 and a heater distribution case 71 are secured to the lower beam component and/or the first beam component.

Figure 11:
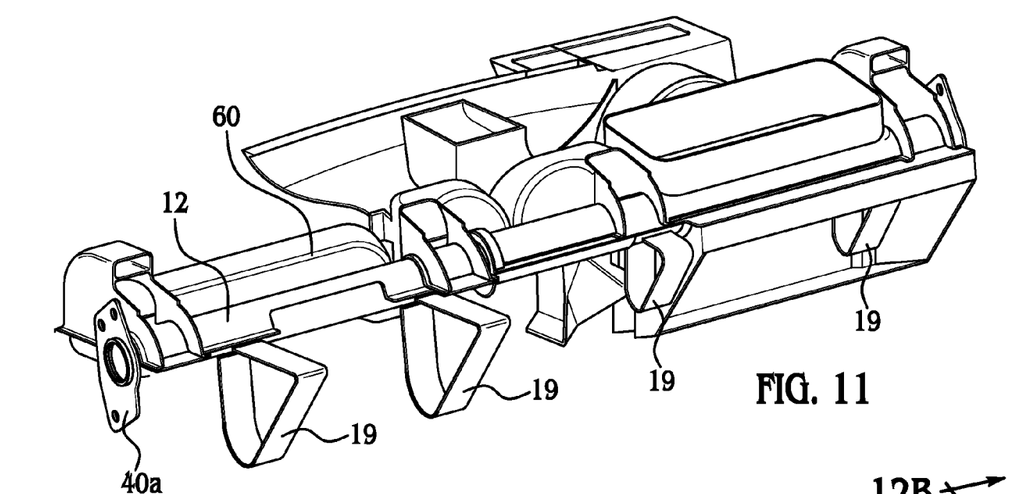
FIGS. 11-12 are views of alternative exemplary embodiments of the present invention.
Figure 12:
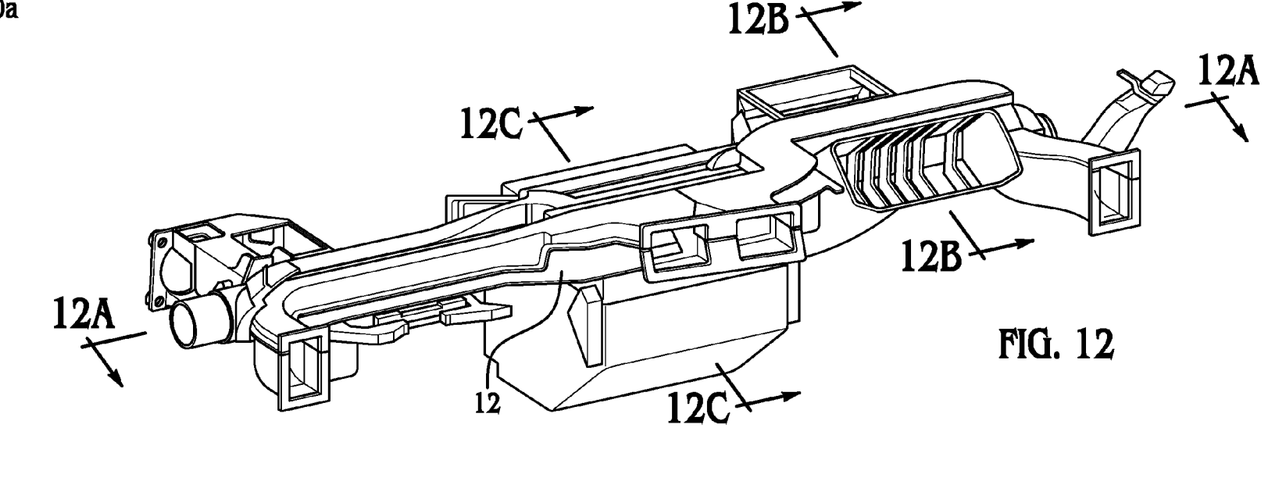
Figure 12A:
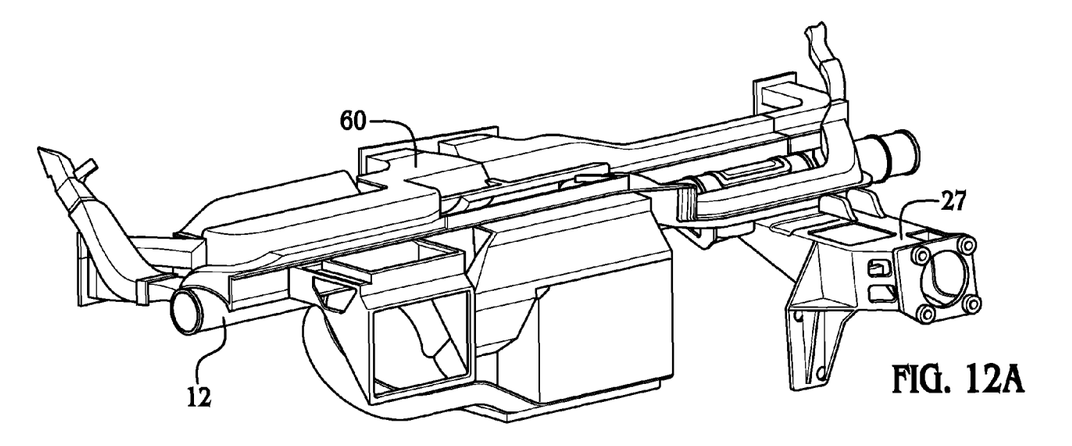
FIG. 12A is a view along lines 12A-12A of FIG. 12.
Figure 12B:
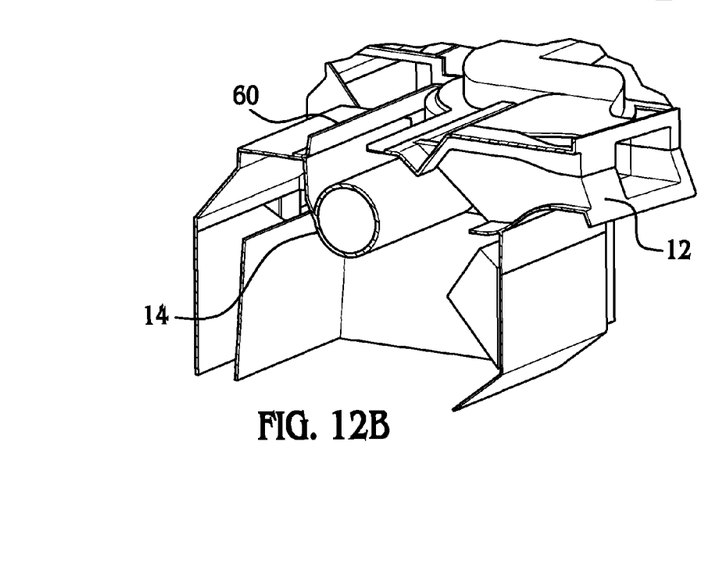
FIG. 12B is a view along lines 12B-12B of FIG. 12.
Figure 12C:
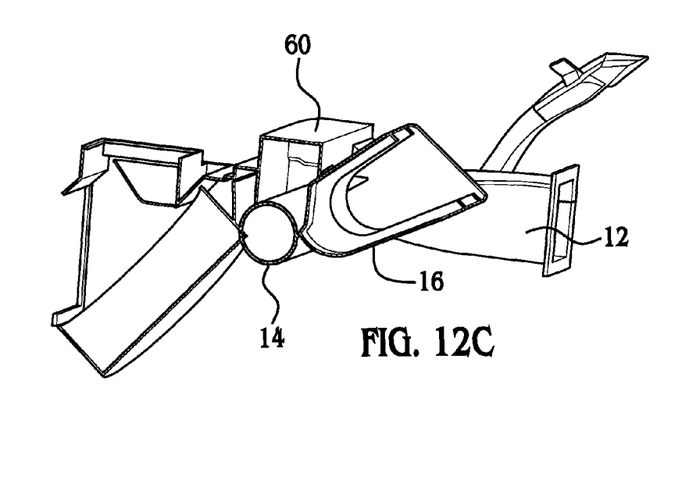
FIG. 12C is a view along lines 12C-12C of FIG. 11.

In one exemplary embodiment, serviceability is provided through a drain pan (not shown), attached to the bottom of the evaporator/heater core section of the case, wherein the system can be serviced Of course, the integrated structural system may have numerous other configurations see for example FIGS. 11-12c.

Referring now to FIG. 1, the integral molding of the lower beam component 60 reduces the number of separate vehicle components. In one exemplary embodiment, and by integrally molding components with the lower beam component 60, the same eliminates the need for an HVAC center bracket 70 and a lower HVAC bracket 72 for securing portions of the HVAC module to the lower beam component 60 since the HVAC module is integrally molded with the lower beam component and/or the first beam component. Also, the lower beam component may be configured to support a glove compartment thereby negating the need for glove box brackets 74a, 74b shown in FIG. 1.

Also and by integrally molding the lower beam component 60 with other features, the lower beam component negates the need for a separate air inlet 76, a filter housing 78, and an upper evaporator case or upper scroll housing secured 80 thereto. Other components can be secured to or about structural member 14 within the confines of lower beam component 60 and should not be limited to the components described above. After molding lower beam component 60, other vehicle components can be secured to lower beam component 60, such as, for example, a filter, the orifice plate, the lower scroll housing, and a heater distribution case.

Figure 8:
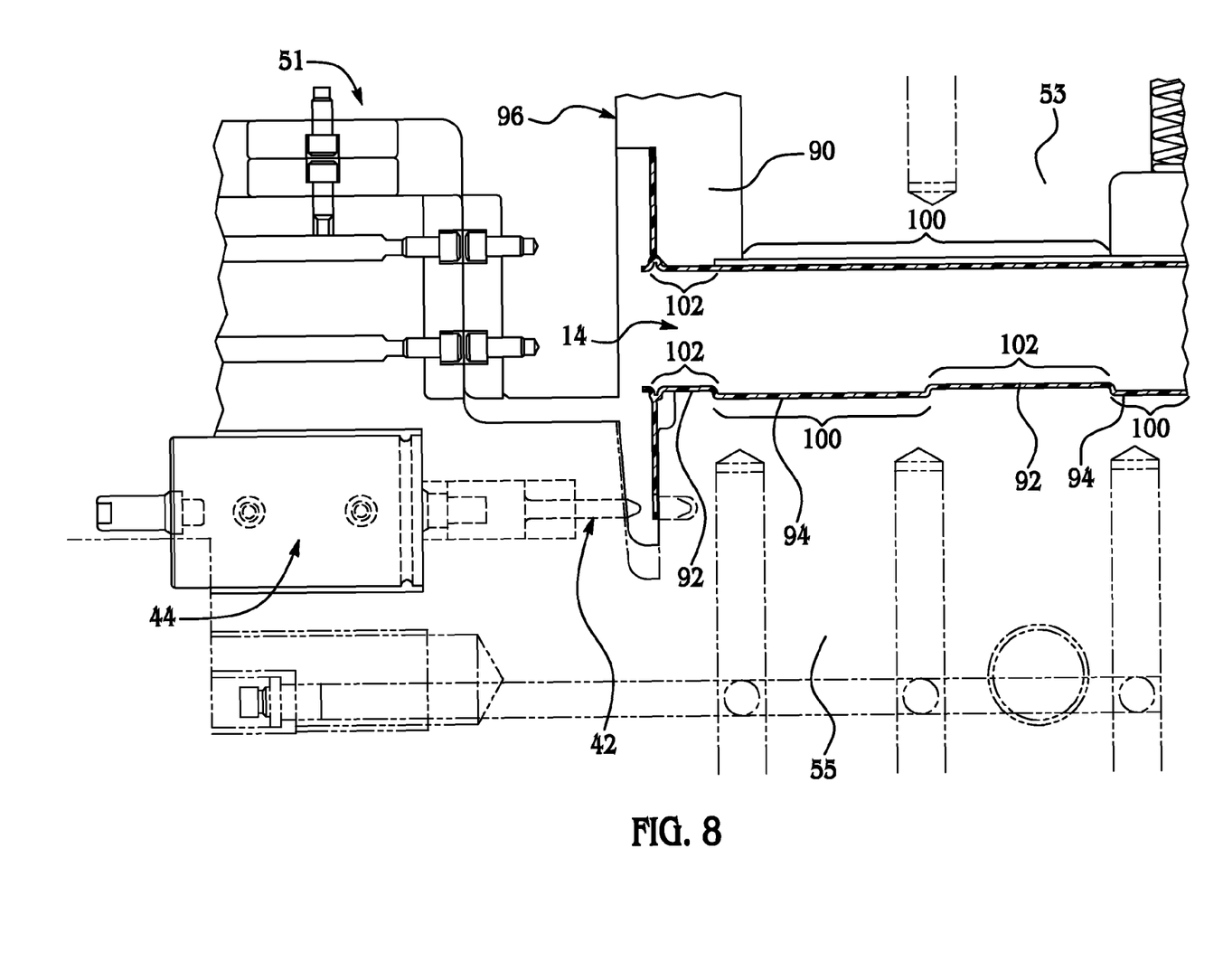
FIGS. 8 and 9 are partial cross-section views of a typical mold construction and an apparatus for protecting areas of the structural beam component in the mold core prior in accordance with an exemplary embodiment of the present invention.
Figures 9, 10:
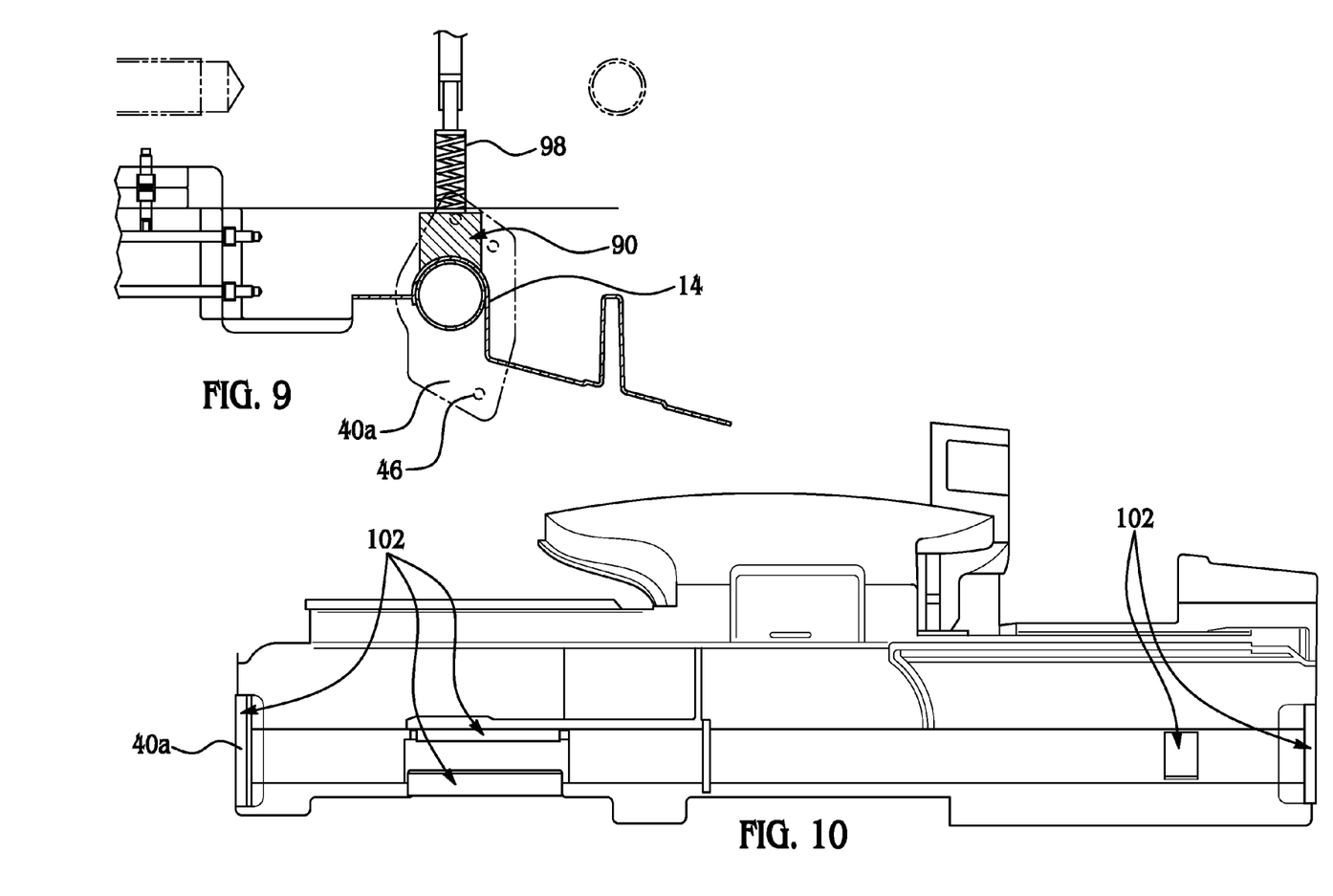
FIG. 10 illustrates portions on an integrated structural system constructed in accordance with an exemplary embodiment of the present invention.

Referring now to FIG. 8, in one exemplary embodiment, one or more insert or pressurized net pads 90 are placed on one or more surfaces along structural member 14 to provide exposed metal surfaces on the structural member 14 for attaching (welding, mechanically fastening bonding, etc.) vehicle components (e.g. steering column, brackets, etc.) thereto after the overmolding process. In accordance with an exemplary embodiment, the net pads are formed from steel, (e.g., chrome plated steel, P20 steel and equivalents thereof) to provide a durable surface for contacting and interacting with the structural member to provide an area that will not be covered by the molded plastic. In other words, the net pads are positioned to prevent plastic from covering local areas along the length of the metal tube 14 and the lower tool is configured to have features or surfaces 92 that contact the structural member while leaving open cavities 94 for receipt of the liquid plastic therein so that the portions of the thermoplastic comprising the first beam component will completely surround portions of the structural component. Upon installation in the mold prior to molding, metal tube 14 is in direct contact with a tool 96 that applies pressure to net pads 90 in those areas where plastic is not desired. To ensure that plastic does not flow between tool 96 and metal tube 14 during molding, pressurized net pads 90 are placed on the cavity half of the mold, which applies a force to the metal tube 14 prior to the introduction of polymer melt to the mold or before first beam component 12 is molded to structural member 14 as shown. In one non-limiting exemplary embodiment, this can be accomplished by having pressurized net pads 90 stand proud (or protrude) from cavity half 96 so that pressurized net pads 90 contact metal tube 14 prior to mold closure. As the mold closes, the insert pads 90 are pushed back into cavity half 96 against the resistance of a spring 98 or nitrogen gas pressure (or any other method which provides resistance) located on the back side of pressurized net pads 90 opposite the metal tube 14.

Accordingly and through the use of the features of the mold tool and the net pads, covered areas 100 and uncovered areas 102 are provided on the structural member. In other words, areas of the structural member 14 remain exposed after molding as a result of intimate contact of either net pads and/or mold steel against the structural member during molding.

Accordingly, areas 102 on tube are those in direct contact with either the mold core/cavity steel or the pressurized net pads during molding to prevent coverage with plastic. These exposed areas of steel can then be used for weldment of other features such as additional brackets after overmolding of the first beam component to the structural component.

In one exemplary embodiment and after the first beam component is molded to the structural member, lower beam component 60 is secured to first beam component 12 after the first beam component 12 is molded about structural member 14 using a vibration welding process, thereby forming integrated structural system 10. Of course, other methods of securing lower beam component 60 to first beam component 12 can be used in accordance with an exemplary embodiment of the present invention to form integrated structural system 10, such as, for example, adhesive bonding, heat staking, mechanical fastening, or a combination thereof.

In accordance with an exemplary embodiment of the present invention, an exemplary method of forming an integrated structural system 10 is provided. In this exemplary method, first steel tube 50 is deformation resistance welded to second steel tube 52, forming structural member 14, where first steel tube 50 is formed with higher mechanical properties than second steel tube 52. Next, end brackets 40a, 40b are secured to a respective end of structural member 14 using the deformation resistance welding process. Then the structural member is inserted into a mold cavity configured to define the first beam component. Once placed in the mold, the hydraulic cylinder mechanism 44 actuates locating pins 42 to engage with openings 46 located on end brackets 40a, 40b. Once locating pins 42 extend into the openings located on end brackets 40a, 40b, a signal is given to start the molding process. In addition, and in accordance with an exemplary embodiment, the locating pins may be used to locate the structural member in the tool. Alternatively, the pins may be used to only ensure the structural member is properly located. In addition, and prior to the molding process, pressurized net pads 90 and portions of the mold are placed along the structural member in contact with the member where plastic is not desired thus, creating discrete areas on the surface of the structural member.

Accordingly, first beam component with the various vehicle components (e.g. housing portion 16) is molded to structural member 14 using various techniques described above. Then, lower or second beam component 60, which is separately formed from a different amount of thermoplastic composite material than first beam component 12, is vibration welded to first beam component 12, such that structural beam 14 is located in between lower beam component 60 and first beam component 12, thereby forming integrated structural system 10.

In summary, significant portions of a conventional HVAC case can be integrated into the upper and lower beam components in accordance with exemplary embodiments of the present invention. Significant portions of the blower motor scroll, diffuser, upper and lower evaporator/heater core cases are now integral, along with the ductwork, to the two beam cases namely, the upper and lower beam components. Integration utilizes common surfaces between components, eliminates separate components and minimizes system NVH issues as well as mass. Serviceability of the HVAC heater core, evaporator core and mode valve system is provided through a drain pan attached to the bottom of the evaporative/ heater core section of the case. Serviceability of additional HVAC actuators, airbag/inflator as well as all other functional components of the system can be accessed via removal of the instrument panel (IP) retainer from above or closeout panels from below as part of the complete instrument panel cockpit system.

In accordance with an exemplary embodiment the integrated structural member comprises a metal tube as the primary structural member. In accordance with an exemplary embodiment the structural member can be manufactured from a single material but can also be comprised of multiple sections of different material types and/or wall thicknesses welded together. Thus, the beam can be tailored to precisely meet the vehicle requirement while minimizing cost and mass of the construction. Likewise, the use of technology such as deformation resistance welding technology facilitates the production of a strong, dimensionally accurate weld using similar or dissimilar materials.

The portion of the beam assembly (either upper or lower) containing the structural member is produced by overmolding a metal tube with thermoplastic polymer (reinforced and/or unreinforced). The metal tube can be almost any shape in cross section as well as axially; however, straightness along the beam axis is optimal from a performance standpoint. A metal tube with a circular cross section provides the greatest resistance to crush during overmolding. The metal tube can also contain some metal brackets prior to post molding; however, shut-off of all perimeter seal surfaces during molding is much simpler if the metal tube contains a minimal number of attachments. Components assembled (welded) to the metal tube after over molding require an exposed metal surface be present. To prevent plastic from covering local areas along the length of the metal tube, shut-off surfaces on the core and cavity halves of the mold are utilized. Upon installation in the mold prior to molding, the metal tube is in direct contact with the tool steel in those areas where plastic is not desired. To ensure that plastic does not flow between the tool steel and the metal tube during molding, pressurized insert pads (net pads) from the opposite (cavity) mold half apply force to the tube prior to the introduction of polymer melt to the mold. This can be accomplished by providing for the insert pads to stand proud (or protrude) from the mold cavity so that they contact the metal tube prior to mold closure.

As the mold closes, the cavity side insert pads are pushed back into the mold cavity against the resistance of springs or nitrogen gas pressure located on the back side of the insert pad opposite the metal tube. Beyond preventing polymer flow on metal tube facing the cavity side of the mold, the cavity side insert pads can also serve to maintain the position of the metal tube during mold filling.

End brackets, which enable the metal tube to be connected to the shear walls of the vehicle, are attached to the metal tube prior to overmolding. Attaching the brackets to the metal tube prior to plastic overmolding ensures accurate and repeatable orientation of the overmolded plastic to the vehicle body after installation. Prior to overmolding, the metal tube with end brackets is loaded into the core half of the mold. Once in position, hydraulic locator pins are actuated and so that they engage with a locating hole in each end bracket. If each pin is fully extended through the hole in its respective end bracket, the signal is given to begin the overmolding process.

Overmolding of the metal tube requires molding pressure to be minimized so as to minimize the potential for tube crush during molding. Alternatively, adequate specific molding pressure is required to ensure the mold fills and plastic is properly "packed out" against the mold cavity and around the metal tube to control the dimensional characteristics of the part. Techniques used to minimize specific molding pressure for compression (extrusion compression, extrusion deposit compression, etc.) molding include melt charge placement, temperature, size and shape. Elevated mold surface temperature during mold filling also allows specific molding pressure to be minimized while enabling adequate material packing. Minimal specific molding pressure enables a very thin gauge steel to be overmolded without damage (crushing). Tailoring the beam material type, wall thickness, and section shape to precisely meet vehicle requirement is greatly enhanced. In addition to reducing specific molding pressure, heating the surface of the mold facilitates improved surface finish, dimensional accuracy, and the ability to minimize part wall thickness.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What claimed is:

1. An integrated structural system for a vehicle, comprising:
   a structural member;
   a first beam component secured to the structural member by a molding process, the first beam component being molded from a first amount of thermoplastic material, wherein the configuration of the first beam component is defined by the molding process;
   a second beam component secured directly and only to the first beam component by a vibration weld, the second beam component being separately molded from a second amount of thermoplastic material, the second beam component having a configuration different from the first beam component, and the system further comprising a first bracket and a second bracket attached to the structural member, the first bracket and second bracket being configured to secure the structural member to a portion of the vehicle and the first bracket and the second bracket each have an opening the opening on the first bracket and second bracket being configured to receive a locating pin for positioning the structural member in a desired position when the first beam component is secured to the structural member.

2. An integrated structural system for a vehicle, comprising:
   a structural member;
   a first beam component secured to the structural member by a molding process, the first beam component being molded from a first amount of thermoplastic material wherein the configuration of the first beam component is defined by the molding process;
   a second beam component secured directly and only to the first beam component by a vibration weld, the second beam component being separately molded from a second amount of thermoplastic material, the second beam component having a configuration different from the first beam component, wherein the structural member includes a first structural member and a second structural member secured together, the first structural member and second structural member being formed from steel, and the first structural member being configured to have higher mechanical properties than the second structural member.

3. An integrated structural system for a vehicle, comprising:
a structural member;
a first beam component secured to the structural member by a molding process, the first beam component being molded from a first amount of thermoplastic material wherein the configuration of the first beam component is defined b the molding process;
a second beam component secured directly and only to the first beam component by a vibration weld, the second beam component being separately molded from a second amount of thermoplastic material, the second beam component having configuration different from the first beam component, wherein the first beam component includes a housing portion configured to define a portion of an airbag module and the housing portion further comprises at least one of the following: a plurality of ribs; a continuous fiber prepeg fabric; a stamped metal bracket; extruded metal bracket; or a combination thereof for reinforcing a localized area of the housing portion.

4. An integrated structural system for a vehicle, comprising:
a structural member;
a first beam component secured to the structural member by a molding process, the first beam component being molded from a first amount of thermoplastic material, wherein the configuration of the first beam component is defined by the molding process;
a second beam component secured directly and only to the first beam component by a vibration weld, the second beam component being separately molded from a second amount of thermoplastic material, the second beam component having a configuration different from the first beam component, wherein the first beam component includes a housing portion configured to define a portion of an airbag module and the structural system further comprises an inflator bracket secured to the housing portion, the inflator bracket being secured to the structural member by a fastener that passes through the structural member and also secures an energy absorbing bracket to the structural member.

5. The integrated structural system as in claim 1, wherein the second beam component defines a plurality of fluid pathways for a heating ventilating and air-conditioning system and the integrated structural system comprises a plurality of mounting surfaces created on the structural member.

6. The integrated structural system as in claim 1, wherein the structural member includes a first structural member and a second structural member secured together, the first structural member and second structural member being formed from steel, and the first structural member being configured to have higher mechanical properties than the second structural member.

7. The integrated structural system as in claim 3, further comprising a first bracket and a second bracket attached to the structural member, the first bracket and second bracket being configured to secure the structural member to a portion of the vehicle and the first bracket and the second bracket each have an opening the opening on the first bracket and second bracket being configured to receive a locating pin for positioning the structural member in a desired position when the first beam component is secured to the structural member.

8. The integrated structural system as in claim 7, wherein the structural member includes a first structural member and a second structural member secured together, the first structural member and second structural member being formed from steel, and the first structural member being configured to have higher mechanical properties than the second structural member.

9. The integrated structural system as in claim 3, wherein the structural member includes a first structural member and a second structural member secured together, the first structural member and second structural member being formed from steel, and the first structural member being configured to have higher mechanical properties than the second structural member.

10. The integrated structural system as in claim 4, further comprising a first bracket and a second bracket attached to the structural member, the first bracket and second bracket being configured to secure the structural member to a portion of the vehicle and the first bracket and the second bracket each have an opening the opening on the first bracket and second bracket being configured to receive a locating pin for positioning the structural member in a desired position when the first beam component is secured to the structural member.

11. The integrated structural system as in claim 10, wherein the structural member includes a first structural member and a second structural member secured together, the first structural member and second structural member being formed from steel, and the first structural member being configured to have higher mechanical properties than the second structural member.

12. The integrated structural system as in claim 4, wherein the structural member includes a first structural member and a second structural member secured together, the first structural member and second structural member being formed from steel, and the first structural member being configured to have higher mechanical properties than the second structural member.

13. The integrated structural system as in claim 2, wherein the second beam component defines a plurality of fluid pathways for a heating ventilating and air-conditioning system and the integrated structural system comprises a plurality of mounting surfaces created on the structural member.

14. The integrated structural system as in claim 3, wherein the second beam component defines a plurality of fluid pathways for a heating ventilating and air-conditioning system and the integrated structural system comprises a plurality of mounting surfaces created on the structural member.

15. The integrated structural system as in claim 4, wherein the second beam component defines a plurality of fluid pathways for a heating ventilating and air-conditioning system and the integrated structural system comprises a plurality of mounting surfaces created on the structural member.

* * * * *